(12) United States Patent
Hayashi et al.

(10) Patent No.: US 12,127,323 B2
(45) Date of Patent: Oct. 22, 2024

(54) COOKING DEVICE

(71) Applicant: Panasonic Intellectual Property Management Co., Ltd., Osaka (JP)

(72) Inventors: Takahiro Hayashi, Shiga (JP); Yuichi Otsuki, Shiga (JP); Hiroyuki Katsube, Shiga (JP); Ryosuke Otani, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 743 days.

(21) Appl. No.: 17/415,013

(22) PCT Filed: Nov. 6, 2019

(86) PCT No.: PCT/JP2019/043526
§ 371 (c)(1),
(2) Date: Jun. 17, 2021

(87) PCT Pub. No.: WO2020/144927
PCT Pub. Date: Jul. 16, 2020

(65) Prior Publication Data
US 2022/0070980 A1    Mar. 3, 2022

(30) Foreign Application Priority Data

Jan. 10, 2019  (JP) ................................ 2019-002480

(51) Int. Cl.
*H05B 6/64* (2006.01)
*A47J 37/06* (2006.01)
*F24C 15/32* (2006.01)

(52) U.S. Cl.
CPC ........ *H05B 6/6485* (2013.01); *A47J 37/0641* (2013.01); *F24C 15/322* (2013.01); *H05B 6/6402* (2013.01); *H05B 6/645* (2013.01)

(58) Field of Classification Search
CPC .. H05B 6/6485; H05B 6/6402; A47J 37/0641; F24C 15/322
(Continued)

(56) References Cited

U.S. PATENT DOCUMENTS 10,132,505 B2 * 11/2018 Son ........................ F24C 15/322
10,368,403 B2 *  7/2019 Hayashi ................. H05B 6/642
(Continued)

FOREIGN PATENT DOCUMENTS

CA       2413914 A1    6/2003
CN     107532802 A     1/2018
(Continued)

OTHER PUBLICATIONS

Machine Translation of JP2001065871A (Year: 2024).*
(Continued)

*Primary Examiner* — Nathaniel E Wiehe
*Assistant Examiner* — Thomas J Ward
(74) *Attorney, Agent, or Firm* — Rimon P.C.

(57) ABSTRACT

A cooking device according to the present disclosure comprises: a heating chamber configured to accommodate an object-to-be-heated; a circulation fan configured to suck air in the heating chamber and blow the sucked air into the heating chamber; a heating chamber internal flow path forming unit disposed inside the heating chamber and configured to define the flow rate and the blowing direction of the air blown into the heating chamber by the circulation fan; and an internal temperature sensor disposed in a circulation path of the air and provided in a region apart from the heating chamber internal flow path forming unit by a predetermined distance, the circulation path being formed inside the heating chamber by the heating chamber internal flow path forming unit.

7 Claims, 14 Drawing Sheets

(58) Field of Classification Search
USPC .......................................................... 219/681
See application file for complete search history.

(56) References Cited

U.S. PATENT DOCUMENTS

2016/0330801 A1    11/2016  Hayashi et al.
2018/0119961 A1     5/2018  Yamashita et al.

FOREIGN PATENT DOCUMENTS

| JP | 2001065871 A | * | 3/2001 | ............... F24C 7/02 |
|----|-------------|---|--------|---------------------------|
| JP | 2001-349556 |   | 12/2001 | |
| JP | 2010-140642 |   | 6/2010 | |
| JP | 2011-242092 |   | 12/2011 | |
| JP | 2013-019594 |   | 1/2013 | |
| JP | 2015-072094 A |   | 4/2015 | |
| WO | 2015/118867 |   | 8/2015 | |

OTHER PUBLICATIONS

The Extended European Search Report dated Jan. 31, 2022 for the related European Patent Application No. 19909133.1.
International Search Report of PCT application No. PCT/JP2019/043526 dated Jan. 7, 2020.
English Translation of Chinese Search Report dated Sep. 26, 2023 for the related Chinese Patent Application No. 201980088138.2.

* cited by examiner

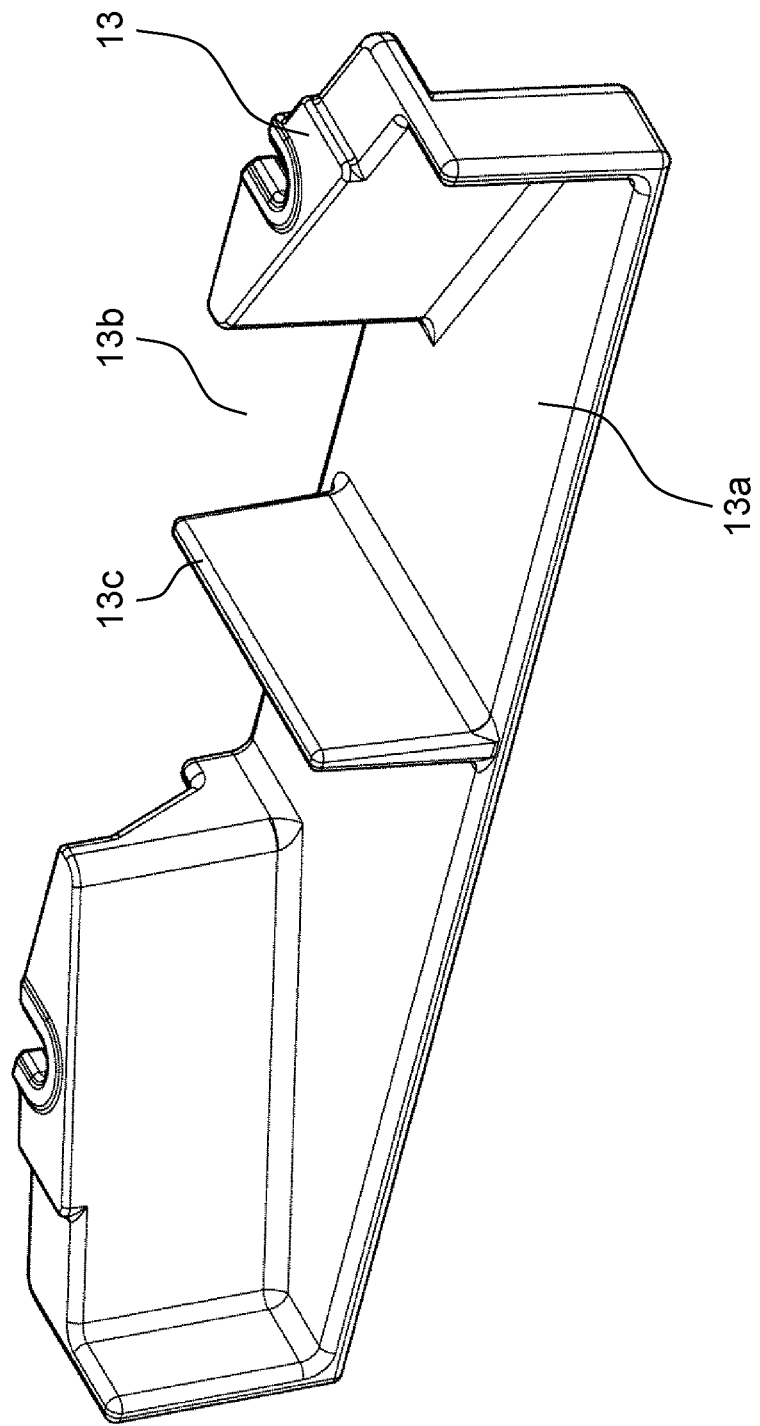

COOKING DEVICE

CROSS-REFERENCE TO RELATED APPLICATIONS

This application is a U.S. national stage application of the PCT International Application No. PCT/JP2019/043526 filed on Nov. 6, 2019, which claims the benefit of foreign priority of Japanese patent application No. 2019-002480 filed on Jan. 10, 2019, the contents all of which are incorporated herein by reference.

TECHNICAL FIELD

The present disclosure relates to a cooking device configured to cook an object-to-be-heated accommodated in a heating chamber.

BACKGROUND ART

A cooking device has various functions, for example, at least one of microwave heating, radiant heating, hot air circulation heating, and steam heating so as to appropriately cook an object-to-be-heated in accordance with details of cooking of the object-to-be-heated (for example, see Patent Literature 1). In order to optimally cook an object-to-be-heated by making use of the above-mentioned functions, it is important to control an internal temperature of a heating chamber configured to accommodate the object-to-be-heated. For the control of the internal temperature of the heating chamber, there is particularly being demanded a temperature detector having accuracy that enables highly accurate detection of the temperature of a region in which the object-to-be-heated is accommodated and high responsiveness that enables instantaneous detection thereof without time lag.

When microwave heating is performed in the cooking device in an empty state in which no object-to-be-heated is accommodated in the heating chamber, in other words, when what is called "empty heating" is performed, there is a risk that a microwave emitted into the heating chamber returns as a reflected wave to a microwave generator without being absorbed in the heating chamber, and thereby damages the microwave generator. Therefore, it is required to immediately detect such "empty heating" state, and stop the heating operation, and, at the same time, inform a user of such state.

CITATION LIST

Patent Literature 1: WO 2015-118867

SUMMARY OF INVENTION

As described above, in a cooking device, it is important to control the internal temperature of a heating chamber, and a temperature detector excellent in accuracy and responsiveness is being demanded. Furthermore, it is important that, particularly when the cooking device performs microwave heating, the cooking device surely detects the "empty heating" state so as not to substantially cause the "empty heating".

An object of the present disclosure is to provide a cooking device capable of detecting the internal temperature of a heating chamber with high accuracy and capable of detecting microwave heating in the "empty heating" state immediately when such heating occurs.

A cooking device according to one aspect of the present disclosure includes: a heating chamber configured to accommodate an object-to-be-heated; a circulation fan configured to suck air in the heating chamber and blow the sucked air into the heating chamber; a heating chamber internal flow path forming unit disposed inside the heating chamber and configured to define the flow rate and the blowing direction of the air blown into the heating chamber by the circulation fan; and an internal temperature sensor disposed in a circulation path of the air, the circulation path being formed inside the heating chamber by the heating chamber internal flow path forming unit, and provided in a region apart from the heating chamber internal flow path forming unit by a predetermined distance.

According to the present disclosure, the internal temperature of the heating chamber can be detected with high accuracy, and, when microwave heating is performed in the "empty heating" state, such heating can be immediately detected.

BRIEF DESCRIPTION OF DRAWINGS

FIG. 11 is a perspective view of a wind duct of the heating chamber internal flow path forming unit.

DESCRIPTION OF EMBODIMENTS

Figure 1:
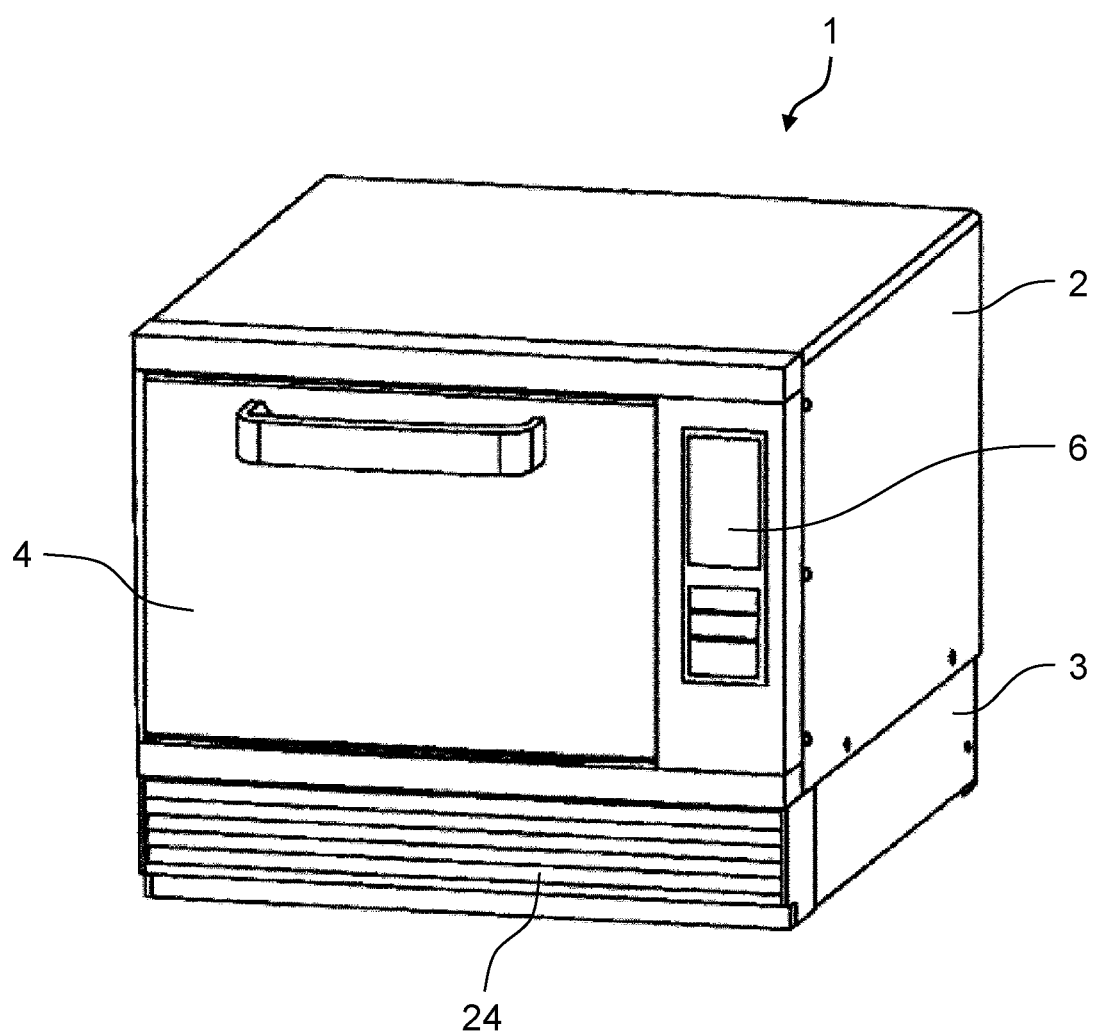
FIG. 1 is a perspective view of the appearance of a cooking device according to Embodiment 1 of the present disclosure.

Hereinafter, as a specific embodiment with respect to the cooking device of the present disclosure, a cooking device having the functions of microwave heating, radiant heating, and hot air circulation heating will be described with reference to the accompanying drawings. Note that the configuration of the cooking device according to the present disclosure is not limited to the configuration of a cooking device described in the following embodiments, and includes the configuration of a cooking device based on a technique equivalent to a technical idea having technical features described in the following embodiments.

Numerical values, shapes, configurations, steps (steps and modes), the order of the steps, and the likes in the following embodiments are only exemplary, and shall not limit the present disclosure. Among constituents in the following embodiments, constituents not included in an independent claim defining the highest concept are described as optional constituents. Note that, in the embodiments, the same constituents will be given the same reference numerals, and descriptions thereof are sometimes omitted. For easy understanding, the drawings are schematic, focusing on the constituents.

First, various aspects with respect to the cooking device of the present disclosure will be described.

A cooking device according to a first aspect of the present disclosure includes: a heating chamber configured to accommodate an object-to-be-heated; a circulation fan configured to suck air in the heating chamber and blow the sucked air into the heating chamber; a heating chamber internal flow path forming unit disposed inside the heating chamber and configured to define the flow rate and the blowing direction of the air blown into the heating chamber by the circulation fan; and an internal temperature sensor disposed in a circulation path of the air, the circulation path being formed by the heating chamber internal flow path forming unit inside the heating chamber, and provided in a region apart from the heating chamber internal flow path forming unit by a predetermined distance.

A cooking device according to a second aspect of the present disclosure is such that, in the first aspect, the internal temperature sensor is configured to operate when the circulation fan is operated.

A cooking device according to a third aspect of the present disclosure is such that the cooking device of the second aspect further includes a plurality of openings in a wall constituting the heating chamber, the openings including a group of first openings and a group of second openings. The group of the first openings is disposed in the central region of the wall and is configured to suck the air in the heating chamber by operation of the circulation fan. The group of the second openings is disposed in a near-top-face region of the wall, and is configured to blow the air near the top face of the heating chamber by operation of the circulation fan. The heating chamber internal flow path forming unit and the internal temperature sensor are provided near the top face of the heating chamber.

A cooking device according to a fourth aspect of the present disclosure is such that, in the third aspect, the heating chamber internal flow path forming unit includes: a wind duct configured to increase the flow rate of the air blown near the top face of the heating chamber by the circulation fan; and at least one wind guide configured to guide the blowing direction from the wind duct to at least a lower part of the heating chamber.

A cooking device according to a fifth aspect of the present disclosure is such that, in the fourth aspect, the internal temperature sensor is disposed in a section, of the circulation path, in which the air blown from the wind duct flows and reaches the wind guide.

A cooking device according to a sixth aspect of the present disclosure is such that, in the fifth aspect, the at least one wind guide includes a first wind guide that, in the circulation path, the air blown from the wind duct first reaches, among the at least one wind guide. The internal temperature sensor is disposed apart from a position of the first wind guide by a predetermined distance.

A cooking device according to a seventh aspect of the present disclosure is such that, in the sixth aspect, a detecting end of the internal temperature sensor is disposed at half the height of the first wind guide projecting from the top face of the heating chamber.

A cooking device according to an eighth aspect of the present disclosure is such that the cooking device in any one of the first to seventh aspects further includes a hot air circulation heater including a heat source configured to apply hot air circulation heating to the object-to-be-heated accommodated in the heating chamber. The hot air circulation heater includes the circulation fan and the heating chamber internal flow path forming unit.

A cooking device according to a ninth aspect of the present disclosure is such that the cooking device in any of the first to eighth aspects further includes a microwave heater, the microwave heater including a microwave generator and a microwave supply unit to apply microwave heating to the object-to-be-heated accommodated in the heating chamber. The internal temperature sensor is configured to operate as a detector configured to detect "empty heating" in microwave heating.

A cooking device according to a tenth aspect of the present disclosure is such that the cooking device in any one of the first to ninth aspects further includes a radiant heater including a heat source configured to apply radiant heating to the object-to-be-heated accommodated in the heating chamber. The internal temperature sensor is disposed immediately above the heat source of the radiant heater provided near the top face of the heating chamber.

Embodiment 1

Figure 2:
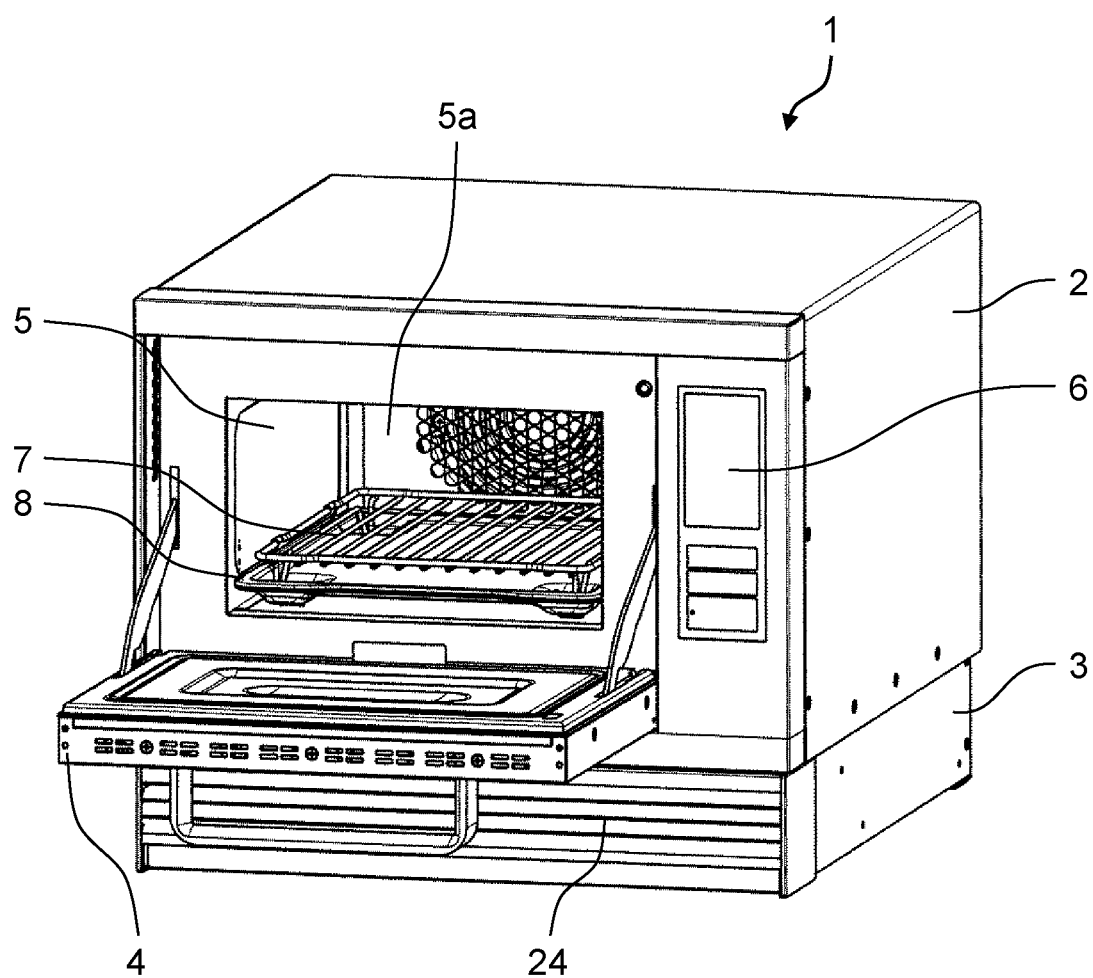
FIG. 2 is a perspective view of a state in which a door is opened in the cooking device of Embodiment 1.

Hereinafter, a cooking device according to Embodiment 1 of the present disclosure will be described with reference to the drawings. FIG. 1 is a perspective view of the appearance of cooking device 1 of Embodiment 1. In FIG. 1, door 4 provided on the front side of cooking device 1 is closed. FIG. 2 is a perspective view of a state in which, in the cooking device of Embodiment 1, door 4 is opened.

Cooking device 1 of Embodiment 1 is a cooking device for business use, for example, a cooking device capable of heating at large output power and used in a convenience store, a fast food restaurant, or the like. In cooking device 1, microwave heating, radiant heating, and hot air circulation heating are selectively performed, independently, sequentially, or in parallel, in accordance with details of cooking.

As illustrated in FIG. 1 and FIG. 2, cooking device 1 includes main body 2 having heating chamber 5; machine chamber 3 provided below main body 2 and supporting main body 2; and door 4 openably and closably provided in the front face of main body 2. Furthermore, operation display 6 operated by a user to display, for example, a setting operation and details of setting for cooking device 1 is provided in the front face of main body 2.

Heating chamber 5 of main body 2 has a space having an approximately rectangular parallelepiped having an opening on the front side thereof, and is configured to be sealed when the opening on the front side is closed by door 4 and to accommodate an object-to-be-heated to be cooked. The object-to-be-heated accommodated in heating chamber 5 is cooked by a hot air circulation heating mechanism provided behind the back face of heating chamber 5, a radiant heating mechanism provided near the top face of heating chamber 5, and a microwave heating mechanism provided below the bottom face of heating chamber 5. The bottom face of heating chamber 5 is formed of a material, such as glass and ceramics, that a microwave can easily penetrate.

The inside of heating chamber 5 is configured to be capable of accommodating rack 7 configured to place an object-to-be-heated thereon and receiving tray 8 disposed below rack 7 and configured to receive fat and the like dripped down from the object-to-be-heated. Rack 7 is, for example, a wire rack made of stainless steel, and is formed of a net-like member capable of placing an object-to-be-heated thereon. Receiving tray 8 is a tray made of ceramics, specifically, made of cordierite (ceramics including magnesium oxide, aluminum oxide, and oxidized silicon). Cordierite has a low thermal expansion coefficient and is highly resistant to thermal shock.

Figure 3:
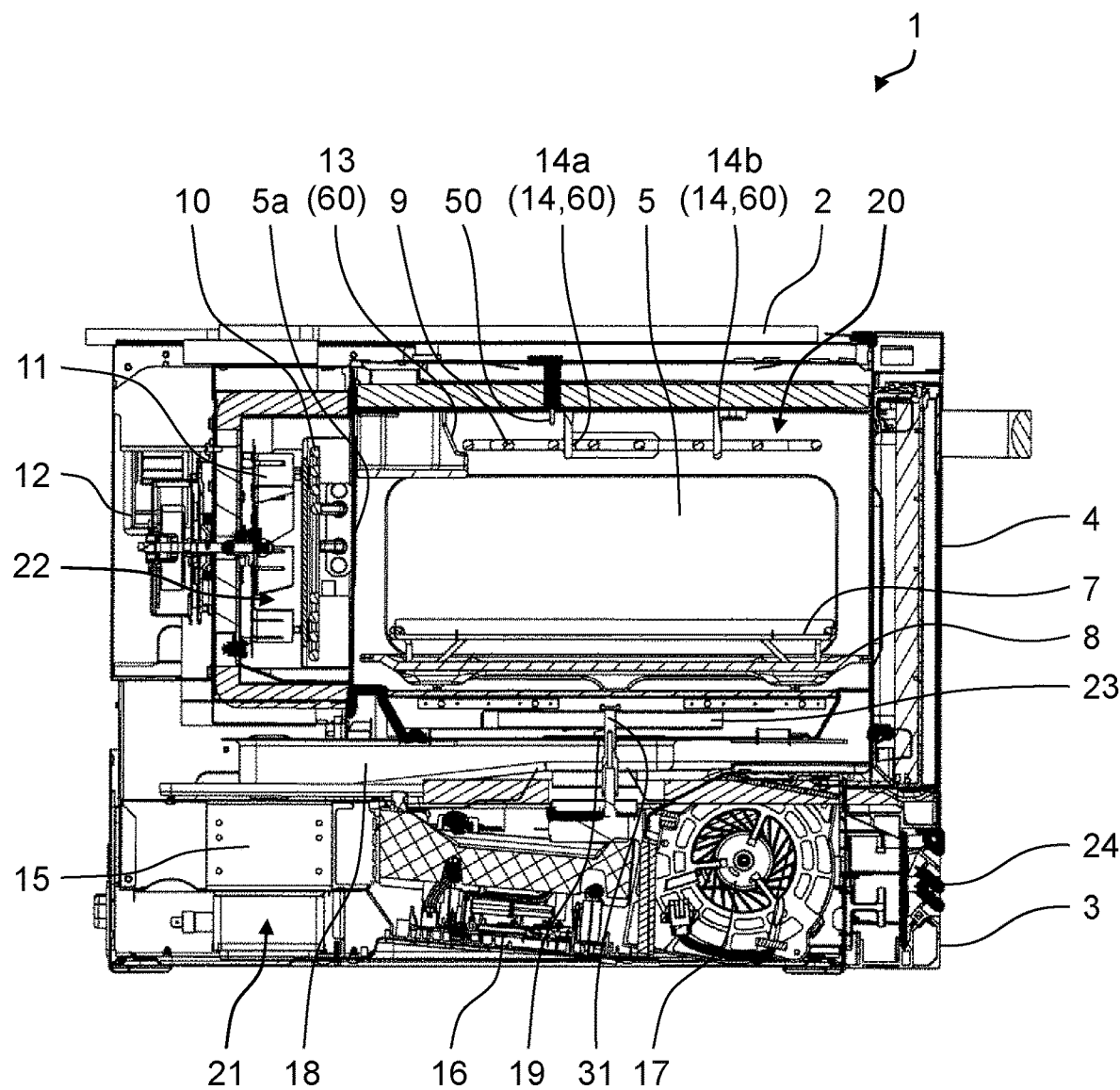
FIG. 3 is a longitudinal cross-sectional view of the cooking device of Embodiment 1.

FIG. 3 is a longitudinal cross-sectional view of cooking device 1 of Embodiment 1. In FIG. 3, door 4 is on the right-hand side, and is provided in the front face of cooking device 1. In the present specification, descriptions will be given, with the door 4 side of cooking device 1 being taken as a front side (a foreside) and a side opposite to the door 4 side (the left-hand side in FIG. 3) being taken as a rear side (a back side).

As illustrated in FIG. 3, grill heater 9 constituting radiant heater 20 is provided near the top face of heating chamber 5. Grill heater 9 serving as a heat source is configured with a single sheathed heater, and disposed near the top face, and has a bent shape (see FIG. 10). Grill heater 9 is driven and controlled in a grill mode (radiant heating operation) in which the object-to-be-heated accommodated in heating chamber 5 is cooked with radiant heat.

Microwave heater 21 is provided in machine chamber 3 disposed below the bottom face of heating chamber 5. Microwave heater 21 mainly includes: magnetrons 15 serving as a microwave generator; inverter 16 configured to drive magnetrons 15; and cooling fan 17 configured to cool a constituent member inside machine chamber 3. Microwave heater 21 is driven and controlled by a control unit described later. Microwave heater 21 further includes: waveguide 18 configured to guide a microwave generated by magnetrons 15 toward heating chamber 5; and microwave supply unit 19 configured to emit the microwave guided by waveguide 18 to the inside of heating chamber 5. Microwave supply unit 19 is disposed at the center of the bottom face of heating chamber 5, and is configured with an opening formed in the top face of an end of waveguide 18. Stirrer 23 is provided above microwave supply unit 19 in order to stir a microwave emitted from microwave supply unit 19. Stirrer 23 is rotated by a stirrer driver (a motor, not illustrated) provided inside machine chamber 3, and has blades for stirring the emitted microwave. Thus, in cooking device 1 of Embodiment 1, a stirred microwave from below the bottom face of heating chamber 5 is emitted uniformly inside heating chamber 5.

Furthermore, in cooking device 1 of Embodiment 1, besides radiant heater 20 and microwave heater 21, hot air circulation heater 22 is provided as a cooking heat source, and driven and controlled by a control unit (not illustrated) including a microcomputer. Hot air circulation heater 22 includes, for example: convection heater 10 serving as a heat source for hot air circulation heating; circulation fan 11 serving as an air blowing source; and fan driver 12 (motor) configured to drive circulation fan 11, and these constituents of hot air circulation heater 22 are provided behind the back face of heating chamber 5. A plurality of openings is formed in back wall 5a serving as the back face of heating chamber 5, and, through these openings, air is sucked from heating chamber 5 and blown into heating chamber 5 by operation of convection heater 10 and circulation fan 11. Hot air circulation heater 22 includes wind duct 13 and wind guides 14 described later. Wind duct 13 and wind guides 14 are provided near the top face of heating chamber 5, and are configured to define the flow rate and blowing direction of wind toward heating chamber 5. In the present disclosure, wind duct 13 and wind guides 14 are disposed inside heating chamber 5, and constitute heating chamber internal flow path forming unit 60 configured to define the flow rate and the blowing direction of air blown into heating chamber 5 by circulation fan 11. Heating chamber internal flow path forming unit 60 is configured to form a circulation path of air blown into heating chamber 5.

As described above, cooking device 1 of Embodiment 1 is provided with radiant heater 20, microwave heater 21, and hot air circulation heater 22 in order to cook the object-to-be-heated accommodated in heating chamber 5. In thus-configured cooking device 1, internal temperature sensor 50 is provided near the top face of heating chamber 5 in order to detect the internal temperature of heating chamber 5. Note that a thermistor is employed as internal temperature sensor 50.

Figure 4:
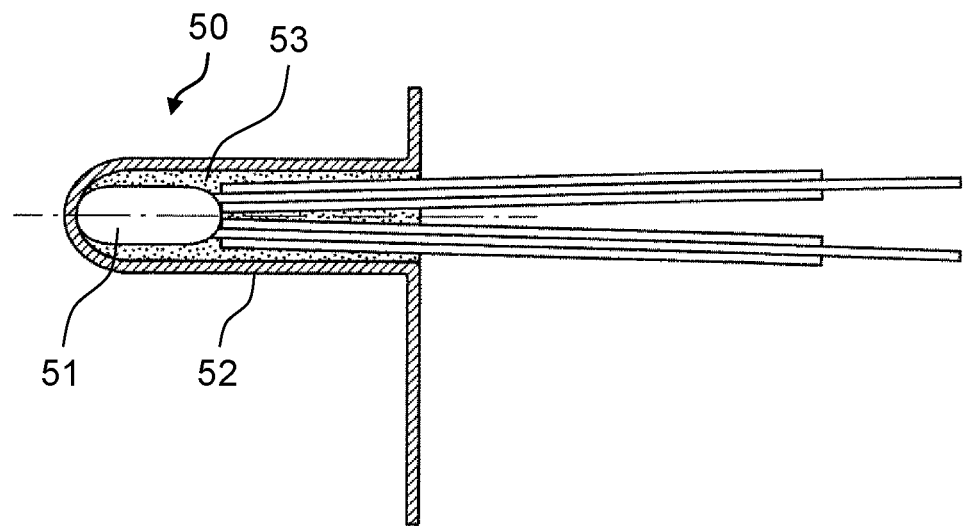
FIG. 4 is an enlarged cross-sectional view of an internal temperature sensor.

FIG. 4 is an enlarged cross-sectional view of internal temperature sensor 50. As illustrated in FIG. 4, thermistor chip 51 serving as a detecting end of internal temperature sensor 50 is housed inside a projecting end of thermowell 52 (for example, a thin-walled stainless steel tube) whose end is closed. Heat-resistant inorganic filler 53 excellent in thermal conductivity is filled in a gap between thermistor chip 51 and thermowell 52. Thus-configured internal temperature sensor 50 is provided to project at the approximate center of the top face of heating chamber 5 (see FIG. 3). Regarding a thermal time constant which affects the responsiveness of a thermistor, a smaller value of the thermal time constant brings about more excellent characteristics. In the present configuration, the thermal time constant is 60 seconds or shorter as a value including the case of using thermowell 52.

[Position of Internal Temperature Sensor 50]

The position of internal temperature sensor 50 is closely correlated with the positions of constituent members of radiant heater 20, microwave heater 21, and hot air circulation heater 22 each described above. In particular, internal temperature sensor 50 is disposed at a specific position in the circulation path formed by hot air circulation heater 22. Internal temperature sensor 50 performs a temperature detecting operation when at least circulation fan 11 of hot air circulation heater 22 is in operation, and therefore, the configuration of hot air circulation heater 22 will be described first.

[Configuration of Hot Air Circulation Heater 22]

Hot air circulation heater 22 includes, for example, convection heater 10 serving as a heat source of hot air circulation heating, circulation fan 11 serving as an air blowing source, and fan driver 12 (motor) configured to drive circulation fan 11, in which convection heater 10, circulation fan 11, and fan driver 12 are disposed behind the back face of heating chamber 5. A plurality of openings is formed in back wall 5a constituting the back face of heating chamber 5. Constituent members of hot air circulation heater 22, such as convection heater 10, circulation fan 11, and fan driver 12, are disposed in a hot air circulation heating region positioned behind back wall 5a. Hot air circulation heater 22 further includes, as constituent members, wind duct 13 and wind guides 14 that constitute heating chamber internal flow path forming unit 60 provided near the top face inside heating chamber 5. Details of the arrangements, functions, and configurations of wind duct 13 and wind guides 14 constituting heating chamber internal flow path forming unit 60 will be described later.

Figure 5:
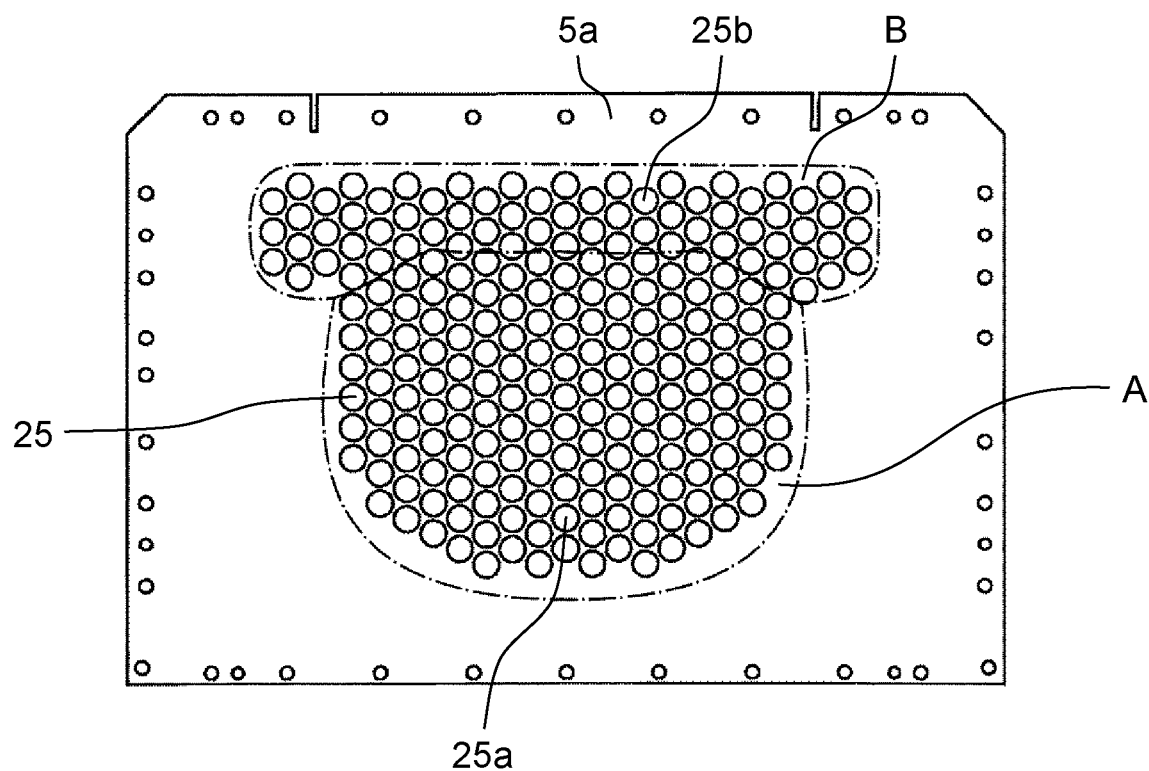
FIG. 5 is a front view of a back wall serving as the back face of a heating chamber.

FIG. 5 is a front view of back wall 5a serving as the back face of heating chamber 5. As illustrated in FIG. 5, a plurality of openings 25 (25a, 25b) are formed by punching in central region A and near-top-face region B of back wall 5a. Openings 25 have an opening shape that does not allow leakage of a microwave emitted in heating chamber 5. First openings 25a formed in central region A as a center part of back wall 5a serve as inlet ports through which air in heating chamber 5 is sucked behind the back face. Second openings 25b formed in near-top-face region B of back wall 5a, which extend in the width direction (right-left direction) near the top face, serve as an outlet port through which air (hot air) is blown into heating chamber 5. In the configuration of Embodiment 1, an example in which first openings 25a and second openings 25b have the same opening shape is described, but, a desired shape is formed in accordance with specifications (such as an inlet volume and an outlet volume) for cooking device 1.

Figure 6:
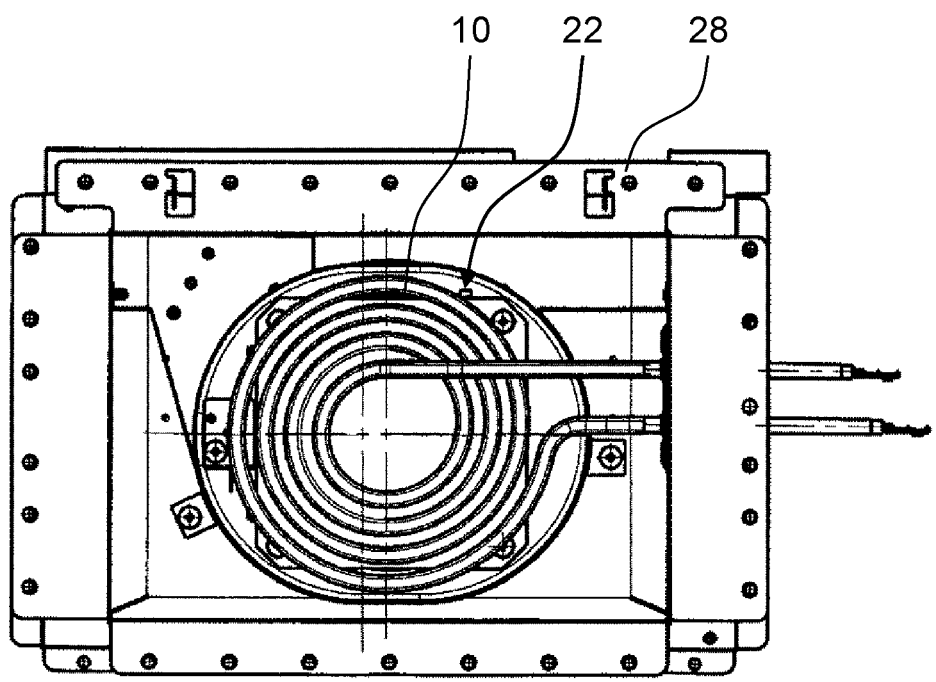
FIG. 6 is a front view of a part of a hot air circulation heater in a hot air circulation region.
Figure 7:
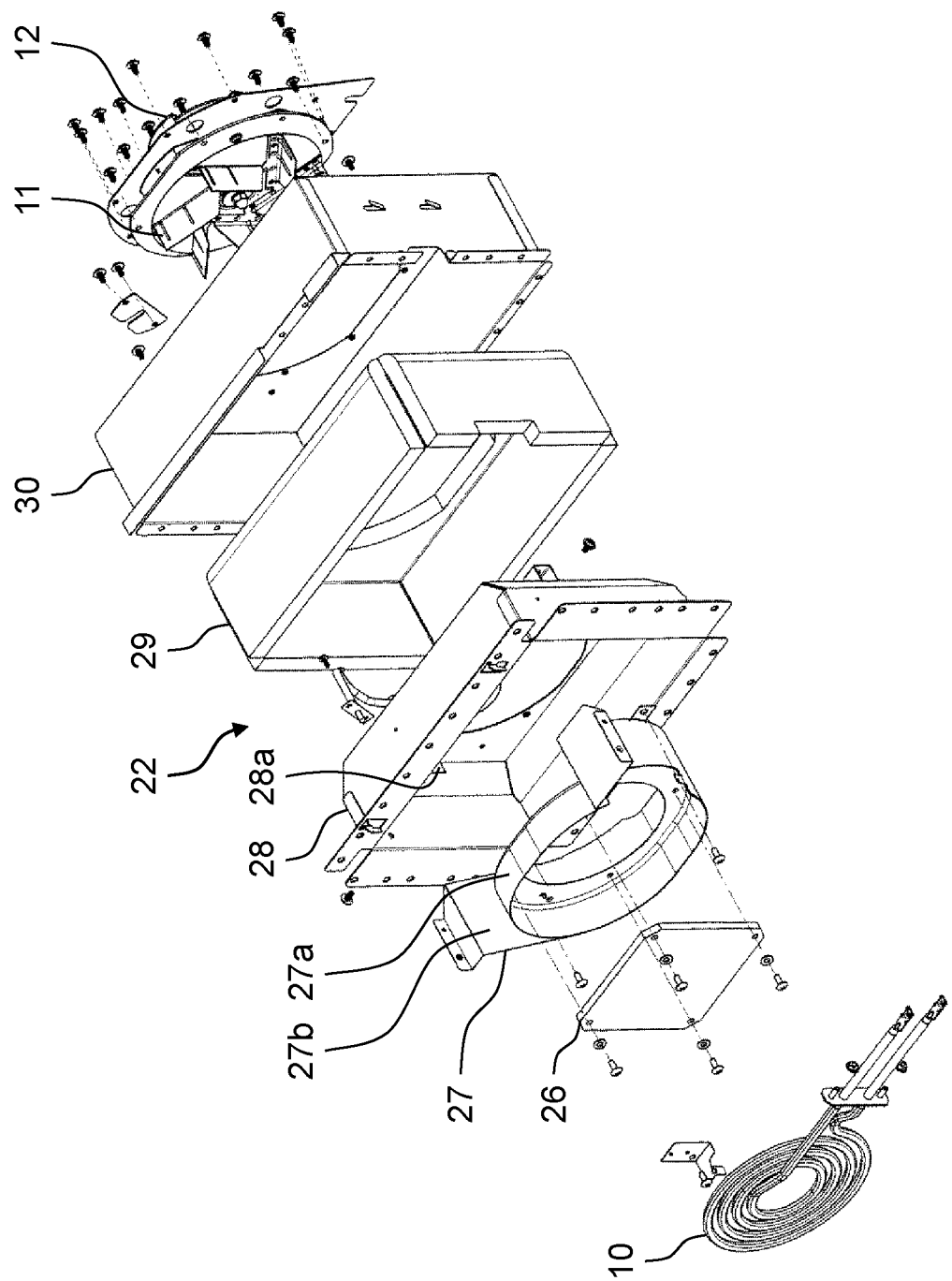
FIG. 7 is an exploded perspective view of the hot air circulation heater in the hot air circulation region.

FIG. 6 is a front view of a part of hot air circulation heater 22 disposed in the hot air circulation heating region. FIG. 6 illustrates a state in which back wall 5a is removed, and heating chamber 5 is positioned at the front in FIG. 6. FIG. 7 is an exploded perspective view of hot air circulation heater 22 disposed behind back wall 5a. As illustrated in FIG. 6 and FIG. 7, in hot air circulation heater 22, convection heater 10 is disposed behind of back wall 5a. Convection heater 10 is configured with a single sheathed heater formed in a spiral shape. A spiral portion of convection heater 10 faces the central region A of back wall 5a, and air sucked from first openings 25a in central region A is heated by convection heater 10.

Behind convection heater 10, for example, circulation fan 11 and fan driver (motor) 12 to suck air in heating chamber 5 are provided. Circulation fan 11 is a centrifugal fan and configured to suck air from a center portion of circulation fan 11 and centrifugally blow air. Air sucked from heating chamber 5 by operation of circulation fan 11 is heated by convection heater 10 to become hot air, and, via catalyst 26 for purification, the hot air is sucked by circulation fan 11 provided inside hot air circulation frame 28, and centrifugally blown.

Mechanisms having a wind guide function, such as air guide frame 27 and hot air circulation frame 28, are provided around convection heater 10 and circulation fan 11. Air guide frame 27 includes: first air guide 27a that is a circular frame provided to surround convection heater 10; and second air guide 27b configured to guide a wind blowing in the centrifugal direction of circulation fan 11 so as to make the wind flow along the top face of heating chamber 5. Air guide frame 27 is fixed to hot air circulation frame 28 having a rectangular frame shape and surrounding the top and bottom, left and right sides of air guide frame 27. A region defined by circular-frame-shaped first air guide 27a faces central region A which is a center part of back wall 5a. Thus, air sucked from heating chamber 5 via central region A of back wall 5a is guided to the position of convection heater 10 and heated to become hot air, and sucked into the center portion of circulation fan 11. The hot air sucked from the center portion of circulation fan 11 is guided, by second air guide 27b disposed around circulation fan 11, to flow along the top face.

The hot air guided near the top face by second air guide 27b comes into contact with the inner face of hot air circulation frame 28 near the top face and is sent to the heating chamber (toward the front face). Third air guide 28a having a plate shape is provided in the inner face of hot air circulation frame 28 near the top face so that the hot air sent near the top face by second air guide 27b is approximately uniformly blown along the top face of heating chamber 5. Third air guide 28a in Embodiment 1 is described as one specific example, but, a plurality of third air guides 28a may be configured to be disposed in parallel. In the configuration of Embodiment 1, the rotational direction of circulation fan 11 is a clockwise direction when viewed from the heating chamber side, and accordingly, third air guide 28a is provided in the inner face of hot air circulation frame 28 near the top face to extend at a position distant by approximately ⅓ of the width from the left end when viewed from the heating chamber side so that a side face of third air guide 28a guides hot air to the heating chamber side. The position of third air guide 28a is suitably set, for example, in accordance with specifications of circulation fan 11 and the shape of hot air circulation frame 28. Note that hot air circulation frame 28 is disposed inside heat insulating frame 30 via heat insulating material 29. Thus, hot air circulation frame 28 is configured to prevent heat of hot air convection frame 28 from being conducted to the outside of the device.

Figure 8:
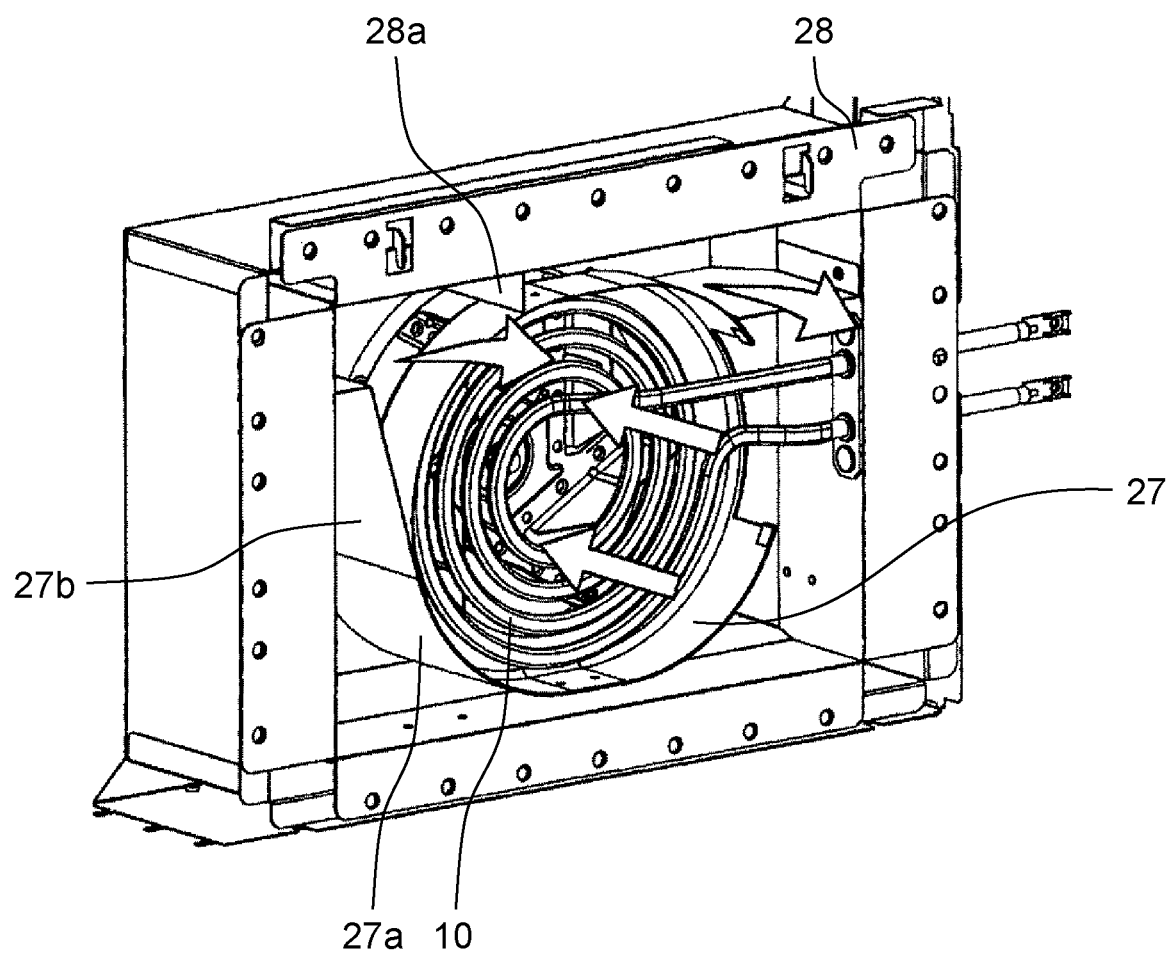
FIG. 8 is a perspective view of the hot air circulation heater in the hot air circulation region.

FIG. 8 is a perspective view of hot air circulation heater 22 in the hot air circulation region (a region located behind back wall 5a). As illustrated in FIG. 8, air sucked through the center portion of the hot air circulation region (central region A of back wall 5a) is guided by first air guide 27a, and heated by convection heater 10 to become hot air, and the hot air is sucked by circulation fan 11. The hot air sucked by circulation fan 11 is blown near the top face of heating chamber 5 by second air guide 27b and hot air circulation frame 28 (including third air guide 28a) each disposed outside circulation fan 11.

[Position of Internal Temperature Sensor 50 with respect to Wind Duct 13 and Wind Guide 14]

Hot air blown near the top face of heating chamber 5 as described above flows through the circulation path formed in an interior space of heating chamber 5 with the aid of wind duct 13 and wind guides 14 of hot air circulation heater 22 on the heating chamber side. Wind duct 13 and wind guides 14 constitute heating chamber internal flow path forming unit 60.

Figure 9:
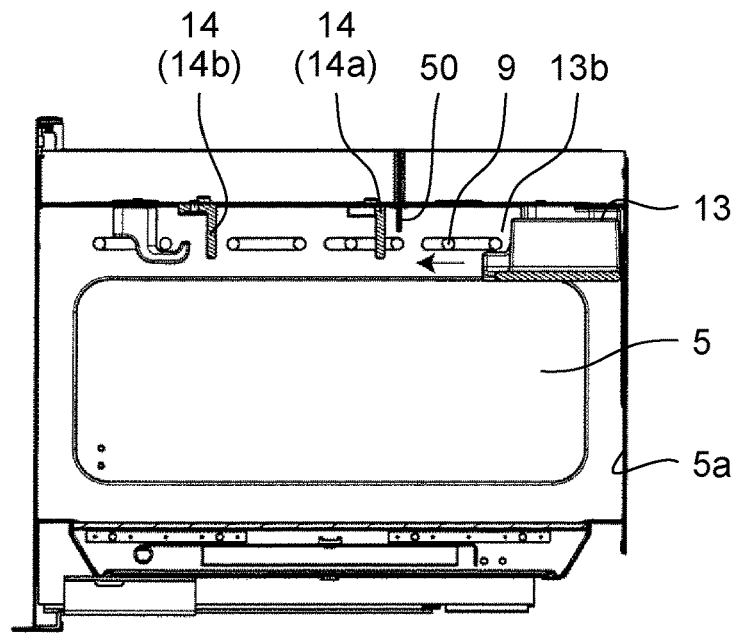
FIG. 9 is a side cross-sectional view of an arrangement of the heating chamber internal flow path forming unit inside the heating chamber.

FIG. 9 is a side cross-sectional view of the arrangement of wind duct 13 and wind guides 14 constituting heating chamber internal flow path forming unit 60 inside heating chamber 5. In FIG. 9, the right-hand side region of heating chamber 5 is the rear region of the hot air circulation heating region provided with convection heater 10 and circulation fan 11, while the left-hand side region of heating chamber 5 is the front region of the hot air circulation heating region. In FIG. 9, main constituents disposed inside heating chamber 5 are illustrated, while other constituents are omitted.

Figure 10:
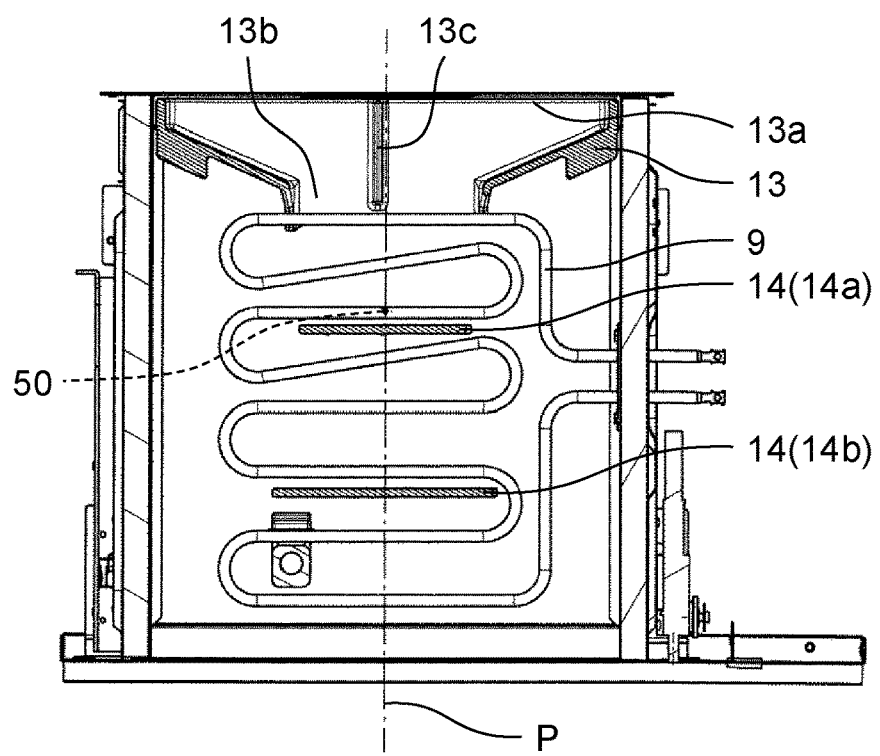
FIG. 10 is a cross-sectional view of the heating chamber internal flow path forming unit near the top face of the heating chamber when the heating chamber internal flow path forming unit is viewed from above.

FIG. 10 is a cross-sectional view obtained when the vicinity of the top face of heating chamber 5 is viewed from above, and illustrates the arrangement of wind duct 13, wind guides 14, grill heater 9, and other constituents. In FIG. 10, hot air flows downward from above.

Hot air blown from near the top face of back wall 5a of heating chamber 5 is adjusted to a desired wind pressure (flow rate) by wind duct 13 and wind guides 14, and flows through the circulation path inside heating chamber 5. Wind duct 13 is configured to collect and narrow the hot air blown from near-top-face region B of back wall 5a and blow the hot air at the desired wind pressure toward grill heater 9 provided near the top face of heating chamber 5.

Figure 12A:
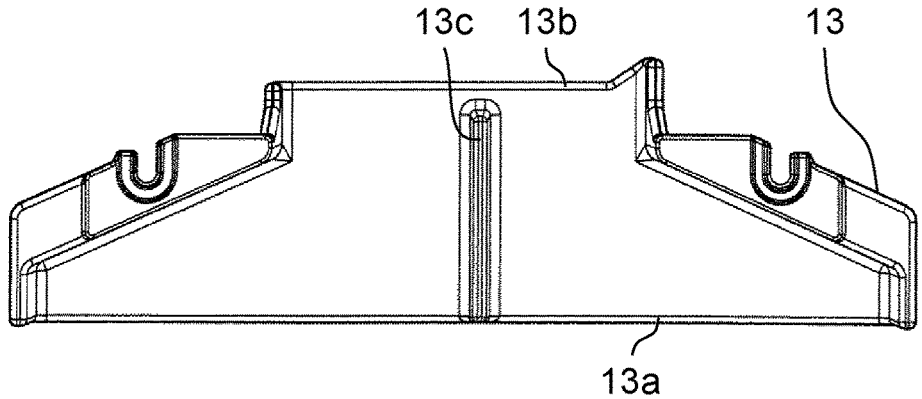
FIG. 12A is a plan view of the wind duct of the heating chamber internal flow path forming unit.
Figure 12B:
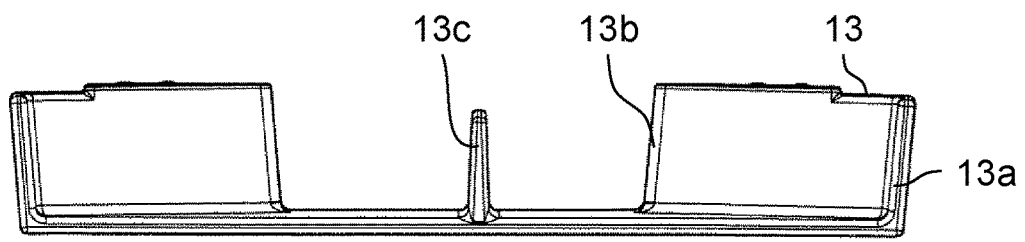
FIG. 12B is a front view of the wind duct of the heating chamber internal flow path forming unit.
Figure 12C:
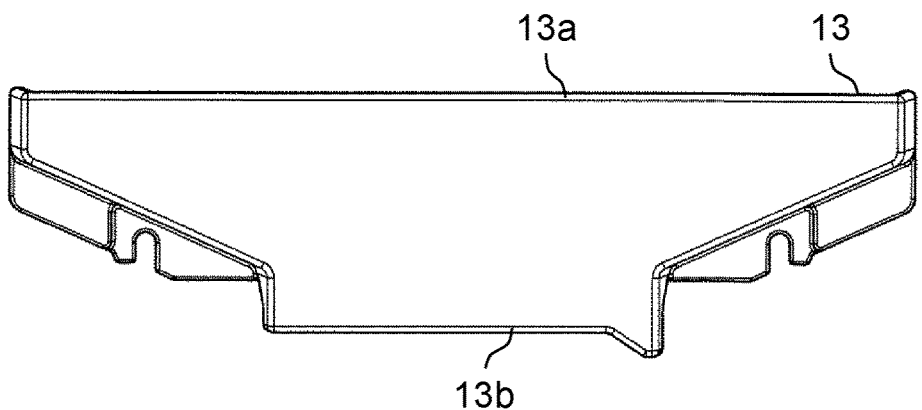
FIG. 12C is a back view of the wind duct of the heating chamber internal flow path forming unit.

FIG. 11 is a perspective view of wind duct 13. FIG. 12A is a plan view of wind duct 13, FIG. 12B is a front view of wind duct 13, and FIG. 12C is a back view of wind duct 13. As illustrated in FIG. 11, FIG. 12A, FIG. 12B, and FIG. 12C, outlet port 13b of wind duct 13 is much narrower than inlet port 13a, and formed smaller at a sectional area ratio of from 30% to 50%. As a result, greater force wind is blown at a higher flow rate from outlet port 13b of wind duct 13. Furthermore, partition plate 13c configured to divide the interior space of wind duct 13 into two sections is provided in wind duct 13. Partition plate 13c is disposed so that wind is blown from outlet port 13b of wind duct 13 approximately equally to the right and to the left. In the configuration of Embodiment 1, wind sent from circulation fan 11 comes at angle with respect to inlet port 13a of wind duct 13, and accordingly, partition plate 13c is disposed to be displaced from the center. In other words, the upstream-side portion of inlet port 13a (in FIG. 11, a right opening of inlet port 13a) is designed to be slightly smaller.

As illustrated in FIG. 9 and FIG. 10, wind blowing forward from outlet port 13b of wind duct 13 blows substantially in parallel with the top face of heating chamber 5. Grill heater 9 is provided near the top face of heating chamber 5 so as to extend in parallel with the top face of heating chamber 5 while being bent, and accordingly wind from outlet port 13b is blown on grill heater 9. Between upstream-side bent portions of grill heater 9 and between downstream-side bent portions thereof, two wind guides 14 (14a, 14b) are respectively disposed in parallel with each other. Thus, wind blowing near the top face of heating chamber 5 comes into contact with first wind guide 14a and second wind guide 14b sequentially. In the configuration of Embodiment 1, two wind guides 14 (14a, 14b) are provided on the upstream side and the downstream side, respectively, but, the present disclosure does not limit the number of wind guides 14 to two, and the suitable number of wind guides 14 are set in accordance with, for example, specifications of the cooking device and the shape of heating chamber 5.

In the configuration of Embodiment 1, first wind guide 14a and second wind guide 14b are fixed to a top face wall of heating chamber 5, and are disposed to face outlet port 13b of wind duct 13. The center in the width direction of outlet port 13b of wind duct 13 is on center line P (see FIG. 10) running from rear to front in heating chamber 5. Both the center in the width direction of first wind guide 14a and the center in the width direction of second wind guide 14b are on center line P. First wind guide 14a and second wind guide 14b extend so as to be perpendicular to center line P. Thus, first wind guide 14a and second wind guide 14b have a contact face perpendicular to the substantial blowing direction of wind blowing from outlet port 13b of wind duct 13 (a direction from the upper part to the lower part in FIG. 10).

As illustrated in FIG. 9, the height (the projection diameter from the top face) of first wind guide 14a disposed on the upstream side is set to be lower than the height (the projection diameter from the top face) of second wind guide 14b disposed on the downstream side, and the lower end of first wind guide 14a and the lower end of second wind guide 14b are each set to be positioned below the lower face of grill heater 9. Furthermore, the width (the diameter in the width direction of heating chamber 5) of first wind guide 14a is set to be narrower than the width (the diameter in the width direction of heating chamber 5) of second wind guide 14b. With the above-described settings and arrangements of first wind guide 14a and second wind guide 14b, wind blowing from outlet port 13b of wind duct 13 comes into contact with first wind guide 14a and second wind guide 14b, sequentially, and blown downward from the approximate entirety of the vicinity of the top face of heating chamber 5.

With respect to wind duct 13 and wind guides 14 (14a, 14b) constituted as described above, internal temperature sensor 50 is disposed in a section, of the circulation path, from outlet port 13b of wind duct 13 to first wind guide 14a. In the configuration of Embodiment 1, internal temperature sensor 50 is provided just in front of the upstream side of first wind guide 14a. Specifically, thermistor chip 51 serving as a detecting end of internal temperature sensor 50 is preferably disposed 5 mm to 15 mm upstream of the contact face of first wind guide 14a. In the present disclosure, a position 5 mm to 15 mm upstream of the contact face of first wind guide 14a is a position in the vicinity of first wind guide 14a, and is a position just in front of first wind guide 14a. In other words, in the present disclosure, "the vicinity of first wind guide 14a" represents "a position 5 mm to 15 mm distant from first wind guide 14a", and "a position just in front of first wind guide 14a" represents "a position 5 mm to 15 mm upstream from first wind guide 14a. Note that, in the present disclosure, "the vicinity of first wind guide 14a" can also be called "a position apart from first wind guide 14a by a predetermined distance", and "a position just in front of first wind guide 14a" can also be called "a position upstream from first wind guide 14a by a predetermined distance.

The position in the height direction of thermistor chip 51 of internal temperature sensor 50 is set to be located at half (including approximately half) the height of the contact face of first wind guide 14a. The specific size relation is preferably such that, when the height (the projection diameter from the top face) of first wind guide 14a is 25 mm to 33 mm, the height (the projection length from the top face) of thermistor chip 51 is 12 mm to 16 mm.

As described above, internal temperature sensor 50 is disposed at a specific position with respect to wind duct 13 and wind guides 14. In cooking device 1 of Embodiment 1, detection of an internal temperature by internal temperature sensor 50 is performed at least when the circulation path of air is formed inside heating chamber 5 by operation of circulation fan 11. In other words, internal temperature sensor 50 performs the detection of an internal temperature when internal temperature sensor 50 is in contact with air circulating through the inside of heating chamber 5. In cooking device 1 of Embodiment 1, while circulation fan 11 is not operated, cooking is not performed, and the detection of a temperature by internal temperature sensor 50 is stopped. This is to avoid the risk of, if temperature detection is allowed to continue although cooking is not performed during the stop of circulation fan 11, erroneously detecting that an internal temperature is abnormal, due to remaining heat on a surface of grill heater 9 and the stop of circulation fan 11.

Figure 13:
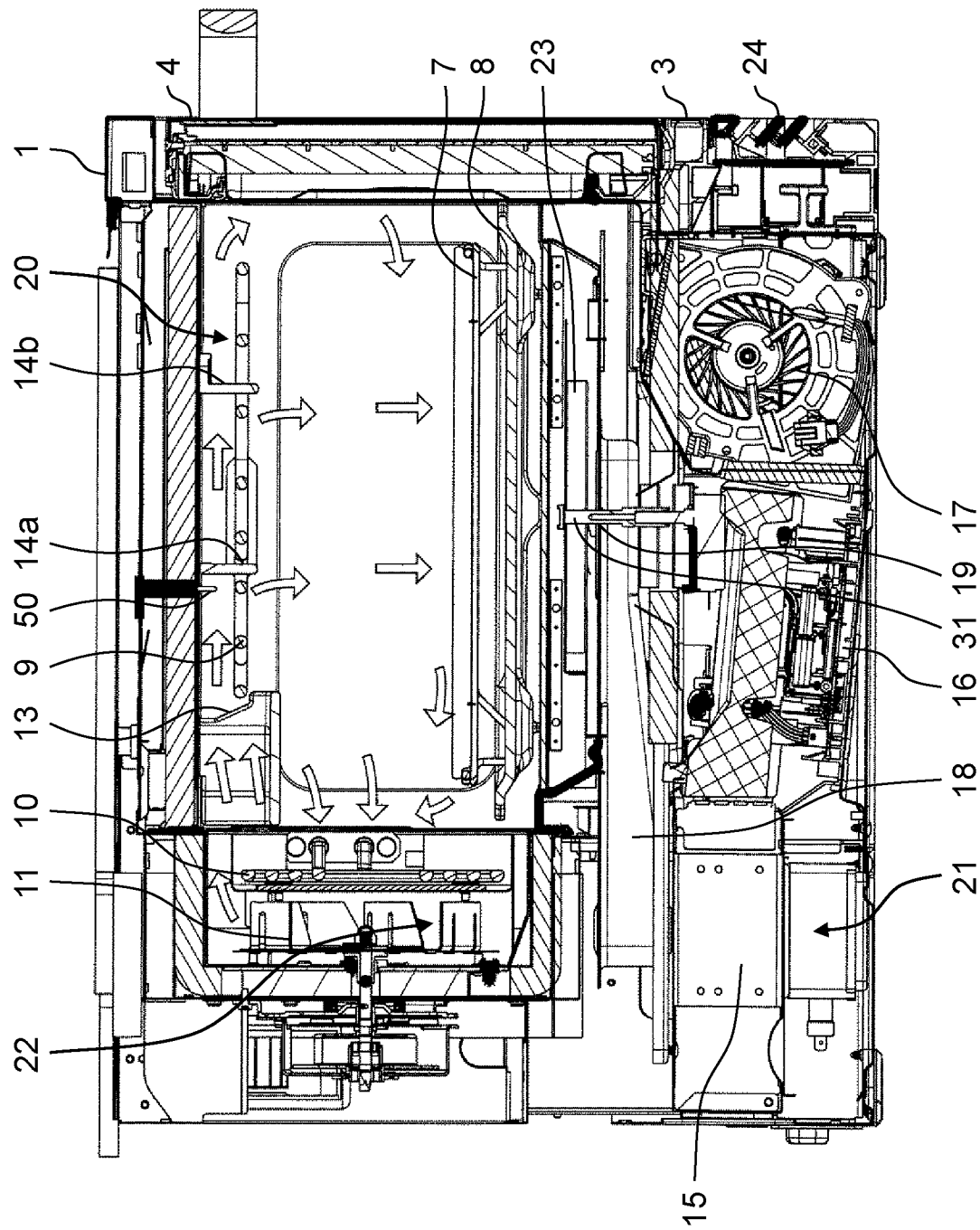
FIG. 13 is a cross-sectional view schematically illustrating the flow of air convecting inside the heating chamber by operation of a circulation fan in a configuration of the cooking device of Embodiment 1.

FIG. 13 schematically illustrates the flow of air convecting inside heating chamber 5 by operation of circulation fan 11 in the configuration of the cooking device of Embodiment 1. As illustrated in FIG. 13, internal temperature sensor 50 is disposed so as to come into direct contact with air blown from outlet port 13b of wind duct 13. Specifically, internal temperature sensor 50 is configured to be surely exposed to circulation air flowing through heating chamber 5 from the central region of the back wall to the hot air circulation heating region and blown from outlet port 13b of wind duct 13 again. In other words, internal temperature sensor 50 is provided in the circulation path inside heating chamber 5.

As described above, the cooking device of Embodiment 1 is configured such that circulation fan 11 is operated at all times while an internal temperature needs to be detected, and hence, the stop of circulation fan 11 indicates the stop of cooking. In the cooking device of Embodiment 1, as long as cooking operation is ongoing, circulation fan 11 is in operation even when hot air circulation heater 22 is not in operation (even when a convection heater is not in operation), and at least, the circulation path of air is formed inside heating chamber 5.

[Position of Internal Temperature Sensor 50 with Respect to Radiant Heater 20]

Next, the position of internal temperature sensor 50 with respect to radiant heater 20 will be described. As described above, radiant heater 20 is configured with grill heater 9 disposed near the top face of heating chamber 5. As is clear from FIG. 9 and FIG. 10, grill heater 9 extends with being bent and snaked in parallel with the top face of heating chamber 5. Grill heater 9 is disposed in the approximate entirety of the vicinity of the top face of heating chamber 5 from a position just in front of outlet port 13b of wind duct 13 to a position in the vicinity of the door 4 on the front side of heating chamber 5. Furthermore, as illustrated in FIG. 10, grill heater 9 is configured to be arranged more densely in a region closer to outlet port 13b and arranged less densely in a region closer to door 4. The purpose of this configuration is to heat the interior space of heating chamber 5 at a uniform temperature, and the configuration is set in consideration of the wind force of air blown from outlet port 13b and the positions of wind guides 14. It is beneficial that the position in the height direction of grill heater 9 is aligned with the position in the height direction of outlet port 13b of wind duct 13, and grill heater 9 is positioned so as to come into direct contact with wind from outlet port 13b.

With respect to grill heater 9 configured as described above and serving as a heat source of radiant heater 20, internal temperature sensor 50 is disposed upstream of first wind guide 14a and immediately above (including approximately immediately above) a portion of grill heater 9, the portion being located closest to the contact face of first wind guide 14a (see FIG. 9).

[Position of Internal Temperature Sensor 50 with Respect to Microwave Heater 21]

Next, the position of internal temperature sensor 50 with respect to microwave heater 21 will be described. As described above, microwave heater 21 includes, for example, magnetrons 15 serving as a microwave generator, and microwave supply unit 19 configured to emit a microwave to heating chamber 5, and is disposed in machine chamber 3 provided below main body 2 in cooking device 1.

As illustrated in FIG. 3 and FIG. 13 described above in machine chamber 3, inverters 16 are provided forward of respectively corresponding magnetrons 15. Cooling fan 17 is disposed forward of inverters 16, and is configured to take in outside air from an outside air inlet port (not illustrated) formed in front cover 24 of machine chamber 3 and send the outside air toward the rear of machine chamber 3. Thus, cooling fan 17 cools inverters 16 and magnetrons 15 sequentially. Air having cooled inverters 16 and magnetrons 15 is guided by a duct (not illustrated) and discharged from the back of cooking device 1.

Figure 14:
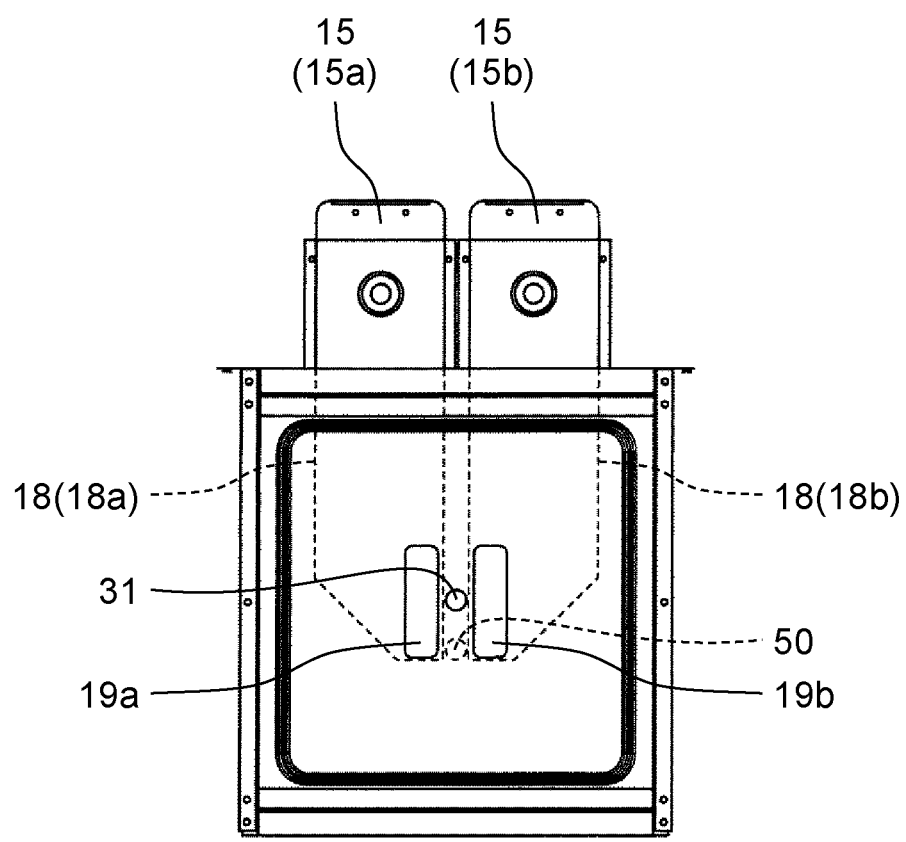
FIG. 14 is a plan view obtained when the bottom face of the heating chamber is viewed from above.

FIG. 14 is a plan view obtained when the bottom face of heating chamber 5 is viewed from above, and illustrates two magnetrons 15 (15a, 15b), the bottom face of heating chamber 5, and waveguides 18 (18a, 18b) provided in parallel from respective magnetrons 15 (15a, 15b) below the bottom face of heating chamber 5. As illustrated in FIG. 14, two magnetrons 15 (15a, 15b) are provided in parallel so as to be adjacent with each other on the rear of machine chamber 3.

Output ends of magnetrons 15a and 15b are respectively connected to waveguides 18a and 18b provided in parallel below the bottom face of heating chamber 5. As illustrated in FIG. 14, one end of each of waveguides 18a and 18b is connected to a corresponding one of magnetrons 15a and 15b, and the other end of each of waveguides 18a and 18b is formed with a corresponding one of microwave radiation ports 19a and 19b. Microwave radiation ports 19a and 19b of waveguides 18a and 18b are connected to microwave supply unit 19 serving as an opening in the bottom face of heating chamber 5, and serve as a port (antenna) for supplying a microwave to heating chamber 5. Stirrer shaft 31 is provided so as to pass between microwave radiation ports 19a and 19b linked to microwave supply unit 19. Stirrer shaft 31 is a rotating shaft of stirrer 23 configured to stir a microwave emitted from microwave supply unit 19, and is provided below the bottom face of heating chamber 5.

In cooking device 1 of Embodiment 1 configured as described above, with respect to microwave heater 21, internal temperature sensor 50 is disposed upstream of stirrer shaft 31 and at a position near the top face, the position facing microwave supply unit 19 (see FIG. 14). In other words, internal temperature sensor 50 is disposed at a position near the top face, the position facing a region between two microwave radiation ports 19a and 19b.

[Verification Experiment on Optimal Position of Internal Temperature Sensor 50]

The inventors of the present disclosure conducted an experiment to verify that a temperature detected by internal temperature sensor 50 is closely related to positions of constituent members in radiant heater 20, microwave heater 21, and hot air circulation heater 22. Based on the results of the verification experiment, internal temperature sensor 50 in cooking device 1 of Embodiment 1 described above is disposed at an optimal position that changes proportionally to an internal center temperature (a temperature at an approximately center position in a heating space in heating chamber 5).

Figure 15:
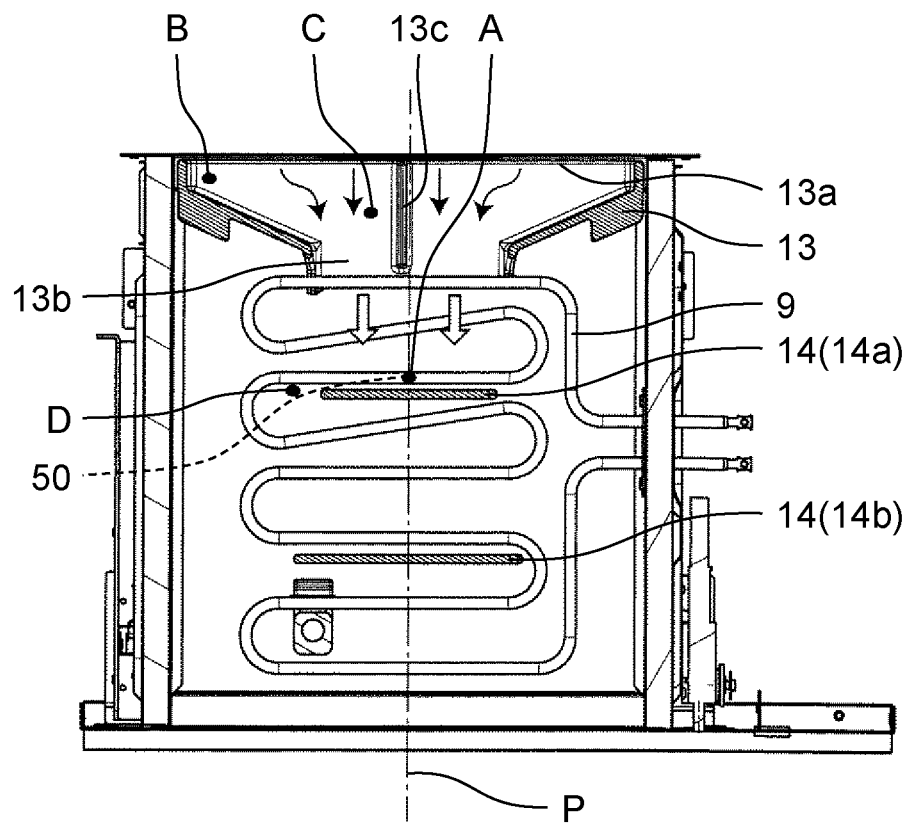
FIG. 15 is a diagram illustrating a position at which the internal temperature sensor is disposed near the top face of the heating chamber in a verification experiment.

Hereinafter, an experiment that the inventors of the present disclosure conducted to verify the optimization of internal temperature sensor 50 will be described. FIG. 15 is a diagram illustrating positions at which internal temperature sensor 50 was disposed near the top face of heating chamber 5 in the verification experiment. FIG. 15 is a diagram obtained when the vicinity of the top face of heating chamber 5 is viewed from above. In this verification experiment, internal temperature sensor 50 was disposed at four positions (A, B, C, D) near the top face of heating chamber 5. Note that, in FIG. 15, hot air flows from outlet port 13b of wind duct 13 toward the lower part of FIG. 15.

Position A is a position used in Embodiment 1, and is upstream of first wind guide 14a and immediately above grill heater 9. Specifically, thermistor chip 51 serving as a detecting end of internal temperature sensor 50 is disposed 10 mm upstream of the contact face of first wind guide 14a. The distance between thermistor chip 51 and grill heater 9 is preferably 3 mm to 6 mm. When thermistor chip 51 is close to grill heater 9, thermistor chip 51 has excellent detection responsiveness to the operation of grill heater 9, and furthermore, when thermistor chip 51 is disposed near the center of first wind guide 14a, thermistor chip 51 has enhanced responsiveness to a change in the flow rate of circulation fan 11. Furthermore, when the height (the projection diameter from the top face of heating chamber 5) of first wind guide 14a was 30.5 mm, the height (the projection length from the top face of heating chamber 5) of thermistor chip 51 was set at 15.5 mm. The above-mentioned numeral values are merely examples, and do not limit the present disclosure to the numerical values. It is beneficial that, at least, for internal temperature sensor 50, thermistor chip 51 serving as a detecting end is disposed at half (including approximately half) the height of first wind guide 14a projecting from the top face.

Position B is a left end position in the width direction of inlet port 13a inside wind duct 13. Position C is in the vicinity of outlet port 13b at the approximately center inside wind duct 13. Position D is a position away in the width direction from first wind guide 14a (specifically a position 20 mm distant from the left end of first wind guide 14a), and a position not directly exposed to hot air blown from outlet port 13b. Note that, at any of the positions (Positions A, B, C, and D), thermistor chip 51 had a height (the projection length from the top face of heating chamber 5) of 15.5 mm.

With internal temperature sensor 50 being disposed at the four positions (Positions A, B, C, D) illustrated in FIG. 15, temperatures were detected in multiple heating modes, and an experiment to make comparisons of the detected temperatures with an internal center temperature in heating chamber 5 (a temperature at the approximately center position in the heating space in heating chamber 5) was conducted. The results of the experiment are illustrated in graphs of FIG. 16.

Figure 16:
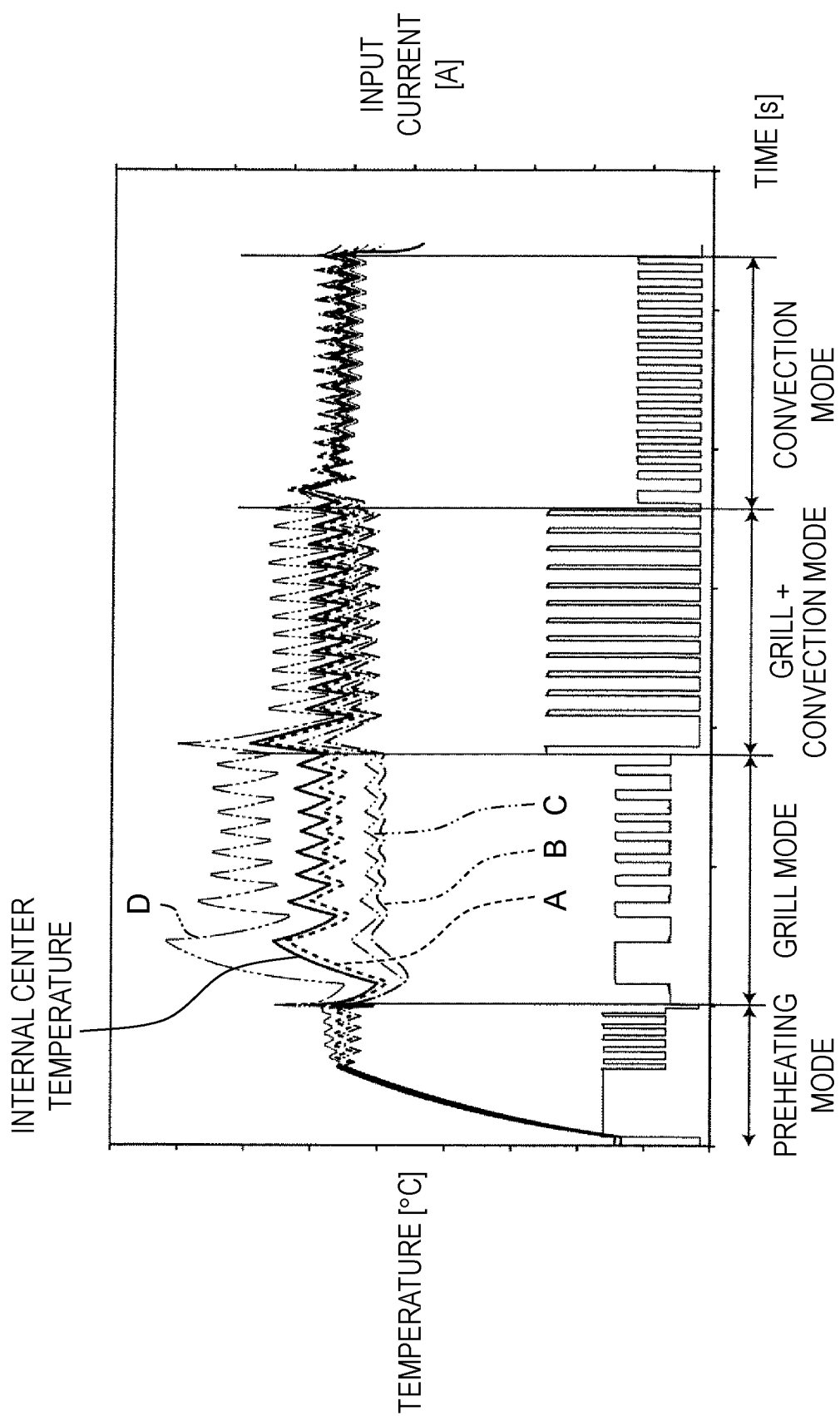
FIG. 16 is a graph illustrating the results of comparative experiments that make comparisons between internal center temperatures of the heating chamber in multiple heating modes and temperatures detected by the internal temperature sensor disposed at specified positions.

In FIG. 16, the vertical axis shows temperature [° C.] and input current [A] in each of the heating modes, and the horizontal axis shows time [s]. In FIG. 16, a solid line shows an internal center temperature in heating chamber 5, and a broken line shows a temperature detected at Position A. Furthermore, a dot-dash line shows a temperature detected at Position B, a dot-dot-dash line shows a temperature detected at Position C, and a dot-dot-dot-dash line shows a temperature detected at Position D.

As illustrated in FIG. 16, this verification experiment is a temperature verification experiment in each of the heating modes used in usual cooking. In the configuration of the cooking device of Embodiment 1 (the position of the internal temperature sensor 50 is changed), operations in the heating modes were performed in the order of "preheating mode", "grill mode", "grill+convection mode", and "convection mode". In the lower part of FIG. 16, an input current waveform in each of the heating modes is shown by a thin solid line.

As is clear from the graphs showing the results of the verification experiment in FIG. 16, the internal center temperature (shown by the solid line) at which an object-to-be-heated is arranged inside heating chamber 5 corresponds to the temperature (shown by the broken line) detected at Position A, and changes approximately similarly thereto.

The temperatures detected at other positions, namely, Positions B, C, and D are greatly deviated from the internal center temperature, and are also different in the state of change from the internal center temperature. Hence, it can be understood that Position A, in other words, a position upstream of first wind guide 14a in a section of the circulation path from outlet port 13b of wind duct 13 to first wind guide 14a and immediately above (including approximately immediately above) grill heater 9 is an optimal position for disposing internal temperature sensor 50 in cooking device 1. It was confirmed through the verification experiment that, when internal temperature sensor 50 is disposed at Position A, an internal center temperature and a change of the internal center temperature can be surely detected with high accuracy and excellent responsiveness.

[Detection of "Empty Heating" in Microwave Heating Mode]

Furthermore, in the verification experiment for internal temperature sensor 50 that was conducted by the inventors of the present disclosure, even when cooking was performed in "microwave heating mode", the temperature (the internal center temperature) of an object-to-be-heated placed at the approximate center of heating chamber 5 was detected with high accuracy. In "microwave heating mode", when microwave heating was performed in the absence of an object-to-be-heated inside heating chamber 5, in other words, when what is called "empty heating" was performed, internal temperature sensor 50 detected a rapid temperature rise immediately after the start of heating. When an object-to-be-heated is microwave-heated, the internal center temperature does not rapidly rise within 1 minute after the start of "empty heating". Thus, it can be detected that heating chamber 5 is in the "empty heating" state.

Internal temperature sensor 50 thus detects a rapid temperature rise shortly after the start of microwave heating, and the reason for this may be that wind guide (14a) disposed in the vicinity of internal temperature sensor 50 is microwave-heated, whereby a temperature rise is caused. Wind guide (14a) disposed inside heating chamber 5 is formed of ceramics, and is not an electric conductor but a dielectric having a smaller dielectric constant. Specifically, wind duct 13 and wind guides 14 are made of cordierite (ceramics including magnesium oxide, aluminum oxide, and oxidized silicon), and has a low thermal expansion coefficient and is highly resistant to thermal shock.

When microwave heating is performed in a state in which an object-to-be-heated having a high volume is placed inside heating chamber 5, the object-to-be-heated absorbs a microwave, thereby being heated. In contrast, in the case of the "empty heating" state in which an object-to-be-heated is not placed in heating chamber 5, for example, wind guide (14a) having a smaller volume is microwave-heated, whereby the temperature of wind guide (14a) rises in a short time. As a result, in the "empty heating" state, internal temperature sensor 50 disposed in the vicinity of wind guide (14a) detects a rapid temperature rise, irrespective of microwave heating, so that the "empty heating" state can be detected. The cooking device of Embodiment 1 is configured such that, when internal temperature sensor 50 detects a rapid temperature rise in the microwave heating mode, it is determined that the "empty heating" is occurring, and then, heating operation is immediately stopped and a user is informed of the "empty heating".

As described above, in the configuration of the cooking device of Embodiment 1, internal temperature sensor 50 is provided at Position A, whereby internal temperature sensor 50 functions as an "empty heating" detector capable of detecting an internal temperature of heating chamber 5 with high accuracy and detecting "empty heating" during microwave heating in a short time. Thus, heating operation can be stopped before a microwave guided from magnetrons 15 to heating chamber 5 is emitted to the inside of heating chamber 5 and reflects to return to magnetrons 15 and damage magnetrons 15.

As described above, in the cooking device of the present disclosure, the internal temperature sensor is disposed at a specific position in the circulation path in the heating chamber in order to detect an internal temperature of the heating chamber with high accuracy, whereby the internal temperature and a change in the internal temperature can be surely detected with high accuracy. The cooking device of the present disclosure is configured to be capable of surely detecting "empty heating" in "microwave heating mode".

The cooking device of the present disclosure is configured to be capable of appropriately controlling an internal temperature of the heating chamber by the use of various heating functions in accordance with details of cooking for an object-to-be-heated and thereby performing optimal cooking. According to the configuration of the cooking device of the present disclosure, temperature control can be realized with accuracy that enables the highly accurate detection of a temperature in a region in which an object-to-be-heated is accommodated, and with excellent responsiveness that enables instantaneous detection without time lag.

Note that the internal temperature sensor in the cooking device of the present disclosure functions when at least a circulation fan in a hot air circulation heater is in operation. Thus, in the cooking device of the present disclosure, the circulation fan is operated at all times while an internal center temperature needs to be detected, and the stop of the circulation fan indicates the stop of cooking.

As the specific configuration of Embodiment 1 was described above, the cooking device of the present disclosure is a cooking device with high reliability and high safety, the cooking device being configured to be capable of detecting an internal temperature of the heating chamber with high accuracy and immediately detecting the state of "empty heating" in microwave heating.

Although the present disclosure was described in the embodiments in a certain degree of details, the configurations are merely exemplary, and the contents of the disclosure of the embodiments shall be naturally varied in details of the configurations. In the present disclosure, the replacement of and the change in the combination and the order of constituents in the embodiments can be realized without deviating from the scope of the claims and concepts of the present disclosure.

The cooking device of the present disclosure is capable of detecting an internal temperature of the heating chamber with high accuracy and capable of detecting the state of "empty heating" in microwave heating before the microwave generator is damaged, and thus is a cooking device having high reliability and high safety and being of superior market value.

REFERENCE MARKS IN THE DRAWINGS

1 . . . cooking device
2 . . . main body
3 . . . machine chamber
4 . . . door
5 . . . heating chamber
5a . . . back wall
6 . . . operation display
7 . . . rack
8 . . . receiving tray
9 . . . grill heater
10 . . . convection heater
11 . . . circulation fan
12 . . . fan driver (motor)
13 . . . wind duct
13a . . . inlet port
13b . . . outlet port
13c . . . partition plate
14 . . . wind guide
14a . . . first wind guide
14b . . . second wind guide
15 . . . magnetron
16 . . . inverter
17 . . . cooling fan
18 . . . waveguide
19 . . . microwave supply unit
20 . . . radiant heater
21 . . . microwave heater
22 . . . hot air circulation heater
23 . . . stirrer
24 . . . front cover
25 . . . opening
50 . . . internal temperature sensor
51 . . . thermistor chip
52 . . . thermowell
53 . . . heat-resistant inorganic filler
60 . . . heating chamber internal flow path forming unit

The invention claimed is:

1. A cooking device, comprising:
a heating chamber configured to accommodate an object-to-be-heated;
a microwave heater including a microwave generator and a microwave supply unit, the microwave generator and the microwave supply unit being configured to apply microwave heating to the object-to-be-heated accommodated in the heating chamber;
a circulation fan configured to suck air in the heating chamber and blow the air into the heating chamber;
a convection heater configured to heat the air sucked from the heating chamber;
a heating chamber internal flow path forming unit disposed inside the heating chamber and configured to define a flow rate and a blowing direction of the air blown into the heating chamber by the circulation fan; and
an internal temperature sensor disposed in a circulation path of the air, the circulation path being formed inside the heating chamber by the heating chamber internal flow path forming unit, wherein:
the circulation fan is configured to suck the air from the heating chamber through a plurality of openings in a central region of the wall forming the heating chamber, and blows the air into the heating chamber from a plurality of openings disposed in a near-top-face region of the wall,
the heating chamber internal flow path forming unit and the internal temperature sensor are provided near the top face of the heating chamber,
the heating chamber internal flow path forming unit includes a wind guide configured to guide the blowing direction of the air blown near the top face of the heating chamber by the circulation fan to at least the lower side of the heating chamber,
the wind guide is a dielectric, and the internal temperature sensor is disposed in a section, of the circulation path, in which the air blown near the top face of the heating chamber flows and reaches the wind guide.

2. The cooking device according to claim 1, wherein the internal temperature sensor is configured to operate when the circulation fan is in operation.

3. The cooking device according to claim 1, wherein the heating chamber internal flow path forming unit includes:
   a wind duct configured to increase the flow rate of the air blown near the top face of the heating chamber by the circulation fan.

4. The cooking device according to claim 1, wherein a detecting end of the internal temperature sensor is positioned at half a height of the wind guide projecting from the top face of the heating chamber.

5. The cooking device according to claim 1, further comprising:
   a hot air circulation heater including a heat source configured to apply hot air circulation heating to the object-to-be-heated accommodated in the heating chamber,
   wherein the hot air circulation heater includes the circulation fan and the heating chamber internal flow path forming unit.

6. The cooking device according to claim 1, wherein the internal temperature sensor is configured to operate as a detector that detects "empty heating" in the microwave heating.

7. The cooking device according to claim 1, further comprising:
   a radiant heater including a heat source configured to apply radiant heating to the object-to-be-heated accommodated in the heating chamber,
   wherein the internal temperature sensor is disposed immediately above the heat source of the radiant heater provided near the top face of the heating chamber.

* * * * *